United States Patent Office 3,348,911
Patented Oct. 24, 1967

3,348,911
METHOD FOR PREPARING HIGH RATE ZEOLITIC MOLECULAR SIEVE PARTICLES
Edward Michalko, Chicago, Ill., assignor to Universal Oil Products Company, Des Plaines, Ill., a corporation of Delaware
No Drawing. Filed May 6, 1965, Ser. No. 453,809
10 Claims. (Cl. 23—112)

This application is a continuation-in-part of my copending application Ser. No. 359,414 filed on Apr. 13, 1964.

This invention relates to an improvement in the manufacture of molecular sieves to produce a sieve which has a high rate of exchange of normal hydrocarbons through the pore entrances. More specifically, this invention relates to an improvement in the manufacture of molecular sieves by converting a refractory oxide particle to a binderless zeolite particle in which the density of the refractory oxide particle is controlled to produce a high rate, low density zeolite. Still more specifically, this invention relates to lowering the density of a refractory oxide particle selected from the group consisting of silica and alumina formed from a hydrogel particle by contacting the hydrogel particle with an organic liquid which is miscible with water and has a lower surface tension than water, then drying and calcining the hydrogel particle to form a refractory oxide particle and thereafter contacting the low density refractory oxide particle with a treating solution containing alkali metal cations and anions selected from the group consisting of silicate, aluminate and hydroxyl and thereby converting the refractory oxide particle to a high exchange rate zeolite particle.

In one of its embodiments, this invention relates to a method of producing a binderless high rate synthetic zeolite having a spherical shape which comprises: mixing together an aqueous silica solution, an aqueous acid selected from the group consisting of hydrochloric and sulfuric acid and an aqueous hexamethylenetetramine solution; forming spherically shaped hydrogel particles from the mixture; contacting the hydrogel particles with an organic liquid selected from the group consisting of methanol, ethanol, propanol (including iso-propanol) and acetone; drying and calcining the resulting hydrogel particles to form low density solid spherically shaped silica particles; bringing the silica particles into contact with an aqueous treating solution containing alkali metal cations and aluminate anions, the composition and amount of the treating solution being established in relation to the weight of silica particles to incorporate sufficient alumina in the finished zeolite to attain a silica/alumina weight ratio of from about 46/54 to about 55/45; and maintaining said particles in contact with the treating solution until the particles are substantially converted to spherically shaped zeolite particles.

Molecular sieves have become increasingly important in the field of adsorbents in the past few years. The sieves are of crystalline structure having many small cavities connected by still smaller pore entrances of uniform size. These pores may vary in size from 3 Angstrom units up to 12 or even 15 Angstrom units. However, a particular molecular sieve material desirably will have a uniform pore entrance size. These crystalline aluminosilicate materials are chemically similar to clays and feldspars and belong in the class of materials called zeolites. Zeolites vary somewhat in composition although they generally contain aluminum, silicon, oxygen and an alkali and/or alkaline earth metal. The zeolites may be dehydrated without destruction of the crystal structure, leaving an interlaced crystal structure of regularly spaced channels.

There are a number of commercially available molecular sieves, each having a particular pore size. It is within the scope of this invention to produce all of these various types such as, for example, Type A, Type X, etc., by the method herein disclosed. Molecular sieves are useful in many applications such as the drying of various fluids and separating hydrocarbon molecules either by polarity or by molecular size selectivity. In this latter mentioned application the molecular sieves having pore entrance sizes of 5 Angstrom units can separate straight chain paraffins from branched chain paraffins and cyclic analogs by selective sorption of the straight chain molecules. This application can be used to upgrade the octane number of a gasoline hydrocarbon mixture by removing therefrom the straight chain paraffins which have a low octane number.

The method herein described may be used to produce alkaline earth metal zeolites by one additional step, namely, the replacement of alkali metal ions with alkaline earth metal ions after the alkali metal zeolite has been produced. This can be accomplished by well-known methods of ion exchange as, for example, soaking the alkali metal zeolite particles in a finishing solution containing the desired alkaline earth metal ions. Thus, for example, the method of this invention can produce 3A, 4A or 5A (where A represents Angstrom units) molecular sieves of a predetermined size and shape by contacting low density silica particles of said predetermined size and shape with an aqueous solution of sodium aluminate and maintaining the particles in contact until the particles have been substantially converted to solid zeolite particles having a 4A size. The 4A zeolite particles may thereafter be ion exchanged with a solution containing calcium ions to produce a 5A zeolite or with potassium ions to produce a 3A zeolite. It has been found that when employing a high density silica particle having an apparent bulk density (ABD) of from about 0.44–0.50 gm./cc. the resulting finished zeolite will have an ABD in excess of 1.0 gm./cc. Although these zeolite particles are very strong and sturdy they have a very low exchange rate for exchanging one normal paraffin with another. This exchange rate is of course essential in processes to separate out normal paraffins from hydrocarbon feed mixtures and is typically accomplished by contacting the sieves loaded with feed normal paraffins with a desorbent and displacing the feed normal paraffins with the desorbent normal paraffins. The desorbent typically is a hydrocarbon stream sufficiently different in boiling point from the feed as to render the feed components easily separatable from the desorbent components by ordinary fractionation.

I have found that the rate of exchange of feed normal paraffins with desorbent normal paraffins is dependent among other things upon the structure of the molecular sieves and if the density of the sieve becomes to high the exchange rate sharply decreases. It is desirable to utilize a stable high exchange rate molecular sieve to be able to economically separate normal paraffins from hydrocarbon mixtures. On the other hand if the density of the sieve becomes too low, then although the exchange rate may be high, the strength of the sieve particles will become so low as to render the sieve fragile and easily crushed which is also undesirable in commercial separation processes. Accordingly, it becomes a balance between the two extremes to produce an efficiently functioning zeolite and I prefer to produce a zeolite having an ABD of from about 0.70 to about 0.95 gm./cc. to optimize the balance between high exchange rates and high strength.

The molecular sieves may be employed both in fluid bed and in fixed bed processes. In either case the sieves are desired in the form of discrete particles rather than powdered masses. In fixed bed processes, sieves of from 8 mesh to 70 mesh in size are preferable whereas in fluid processes sorbents of from 100 to 200 or even 350 mesh in size are preferable. Some gas treating beds of sieves employ very coarse size particles in the 4 to 10 mesh size range. The use of particles in substantially spherical shape offers numerous advantages, particularly when the particle is used as an adsorbent, treating, refining or purifying agent or as a catalyst or component of a catalyst for the conversion of organic compounds and still more particularly for the conversion or separation of hydrocarbons. When used as a fixed bed of packing material in a reaction or adsorption contacting zone, the spherical shaped particles permit more uniform packing and thereby reduce variations in pressure drop through the bed and accordingly reduce channeling which otherwise results in a portion of the bed being bypassed. Another advantage in the use of particles of spherical shape is that the spheres contain no sharp edges to break or wear off during processing or handling and therefore reduce the tendency to plug the process equipment. These advantages are magnified when the partciles are used as a moving or fluid bed, that is, when the particles are transported from one zone to another by either the reactants or by an extraneous carrying medium. It has thus seen that the use of particles in this shape permits a more effective utilization of these particles.

Present methods of producing synthetic zeolites are not satisfactory in producing particles of desired shape, size and uniformity of exchange rates. Typically prior art methods produce synthetic zeolites in a finely divided powdered form in sizes ranging from 0.5 to 5 micons. In order to obtain the zeolites in a useful size, the powdered zeolite is agglomerated with a binder such as clay to produce particles of desired size. These particles are typically produced in pellets or beads of nonuniform size, shape and performance characteristics by methods such as extrusion. In order that the particles be of sufficient hardness, binders up to 20 or more weight percent of the total particle are employed. This results in a heterogeneous mixture of zeolite and binder in which the binder contributes nothing to the zeolite particle as a sorbent but instead occupies valuable space in the particle. Probably the binder results in poorer zeolite particles as the binder may tend to plug some of the pores and otherwise interfere with the sorbent activity. The method of this invention can produce high exchange rate synthetic zeolites of any desired size and shape without the use of binders.

It is an object of this invention to produce a high exchange rate binderless synthetic zeolite of any desired size and shape.

It is another object of this invention to control the density of the finished zeolite and thereby control its exchange rate.

It is a more specific object of this invention to prepare a binderless, high exchange rate zeolite particle from a refractory oxide selected from the group consisting of silica and alumina in which the density of the refractory oxide is controlled thereby to produce the zeolite of desired density.

It is another more specific object of this invention to produce a spherical binderless zeolite particle having high exchange rates and of sufficient hardness to be suitable for use in a commercial separation process to separate straight chain paraffins from their branch chain isomers and cyclic analogs.

These and other objects will become more apparent in the light of the following detailed description.

One of the starting materials in the process of this invention are solid particles of desired size and shape composed of silica, alumina or mixtures of silica and alumina. Typically silica particles can be produced by contacting water glass or silica frits with water to produce an aqueous solution containing about 16% silica. This solution is added to a strong acid such as hydrochloric, sulfuric, nitric, phosphoric or some organic acid, to give a silica sol having a pH of less than 4. Hexamethylenetetramine is added to the silica sol and the resulting mixture is dropped in discrete particles to form hydrogel particles. Various dropping techniques such as vibration are well known to produce spherical hydrogel particles of desired size. The hydrogel particles are aged typically at temperatures in the range of 90° C. to 150° C. in the forming oil and then water washed to remove salts. Silica-alumina particles may be typically prepared in the following manner. A silica sol is prepared as described above. An alumina sol is prepared by digesting substantially pure aluminum pellets in HCl at conditions such that the aluminum to chloride weight ratio is substantially in the range of 1.0 to 1.4. The silica sol and the alumina sol are mixed together in such proportions as to give the ultimate desired $SiO_2/Al_2O_3$ ratio, urea and hexamethylenetetramine are added and the resultant mixture dropped into a forming oil at temperatures less than 100° C. in discrete particles to form hydrogel particles. Again the hydrogel particles are aged in forming oil and water washed to remove salts. Alumina particles are prepared by producing an alumina sol, as described above and adding hexamethylenetetramine and urea as sources of ammonia for gelation and subsequent neutralization of the sol. This mixture is dropped into a forming oil at temperatures less than 100° C. in discrete particles to form hydrogel particles of desired size and shape. The alumina hydrogel particles are again aged in forming oil and water washed to remove salts.

Any of the above three types of water washed particles are thereafter contacted with a liquid which is miscible with water and has a lower surface tension than water. The liquid is preferably an organic liquid having the above characteristics. An organic liquid having a low boiling point such as those liquids having from 1 to about 5 carbon atoms per molecule are suitable. Especially preferable organic liquids comprise alcohols and ketones and the most preferable liquids include methanol, ethanol, propanol (including isopropanol) and acetone. Normally the hydrogel particles having water in the capillaries of the particle structure are dried directly and as the water is removed from the particle it results in shrinkage of the particle. It is postulated that the water, having a high surface tension, tends to pull the particle together and thereby shrink the particle size and increase its density. By contacting the hydrogel particle with the above described organic liquid, some of the water is displaced by the organic liquid and when the particle is subsequently dried and calcined, since the liquid in the capillaries has a lower surface tension, there will be less shrinkage and therefore a lower density calcined particle will be formed. The more of the water that is displaced by the organic liquid the less the shrinkage will be and the lower the density of the calcined particle. Therefore this organic liquid contacting step is employed to displace some of the water in the hydrogel particle and by controlling the amount of displaced water the density of the calcined particle is controlled. The temperature of the organic liquid contacting step is preferably from room temperature to about 95° C. Typically, this is accomplished by draining off the water from the containing vessel after the water washing step is completed and introducing the organic liquid into the vessel containing the water-washed hydrogel particles. The particles are allowed to soak in the organic liquid for a period of from 1 hour to about 24 hours. The organic liquid is drained off the vessel and if desired a second and even a third washing with fresh organic liquid may be accomplished in order to effect further displacement of water with organic liquid. The total contact time of the hydrogel particles with the organic liquid is a variable that can be used to vary the amount of water displaced. In general the total contact time will be less than 48 hours.

The organic liquid contacted hydrogel particles are thereafter dried and calcined by the following procedure. The particles are first dried in air at about room temperature by contacting the particles with moving air. This procedure is continued until the individual particles have become firm enough to roll freely on a flat surface. Thereafter the particles are contacted with dry air at a temperature of 100° C. for a period of from 1 hour to about 12 hours. When the drying is completed calcination is accomplished by gradually raising the temperatures to within the range of from 350° C. to about 700° C. and preferably about 600° C. and maintaining them there for a period of from 1 hour to about 12 hours. After the calcining is completed, the particles are in the form of a low density, refractory oxide of a size and shape desired for the finished zeolite. By low density, I mean that instead of the usual ABD of about 0.45 gm./cc. formed by directly drying the water washed particles, the ABD may be lowered as much as down to about 0.24 gm./cc. by first contacting the water washed particles with the organic liquid. Preferably, the ABD of the calcined particles is from about 0.25 to about 0.35 gm./cc.

The preparation of low density calcined refractory oxide particles is the key to the successful production of high exchange rate zeolites. Other techniques for producing calcined refractory oxide particles having an ABD of from about 0.25 to about 0.35 gm./cc. may also be employed such as variations in the aging conditions maintained on the hydrogel particles, variations in the water washing conditions and other foreign additives in the water wash such as acetic acid and sulfuric acid to attain a low density refractory oxide particle. In general, any technique for reducing the density of the refractory oxide particle may be effectively combined in the process of this invention to produce high exchange rate zeolites. This is especially true when the refractory oxide is either silica or alumina. If the refractory oxide is a silica-alumina mixture especially if of the desired ratio of the finished zeolite then there is very little increase in the density when converting the silica-alumina particle to the zeolite particle and it is not necessary to use a low density silica-alumina particle. On the other hand if the ratio of silica to alumina in the refractory oxide particle is far removed from the desired ratio (i.e. if the silica/alumna ratio is 95/5 and the zeolite is to have a 50/50 ratio) then there will be a substantial increase in density when converting the refractory oxide to a zeolite and a low density refractory oxide particle is preferably employed. It is preferable that the finished zeolite have an ABD within the range of from about 0.70 to about 0.95 gm./cc.

The particles are thereafter converted to a zeolite by contacting one of these three types of calcined low density refractory oxide particles with an aqueous treating solution containing alkali metal cations and anions selected from the group consisting of hydroxyl, silicate and aluminate, the composition of said treating solution being established in relation to the original composition of said particles to incorporate both silica and alumina in the finished zeolite in the desired amounts. It is known that when one of the above mentioned three calcined particles having a definite size and shape has been reacted with the treating solution, a molecular rearrangement and reaction occurs within the particle thus forming a zeolite structure having substantially said definite size and shape. Therefore, the size and shape of the produced zeolite is substantially the size and shape of the calcined particle. If silica or alumina calcined particles are employed then a substantial weight of alumina or silica respectively must be incorporated into the particles without substantially increasing the size of the particle which means that the density of the particle must increase. It is apparent that if the density of the calcined particle is high the density of the zeolite particle will be correspondingly higher. I have found that when using a calcined silica particle having an ABD of 0.47 gm./cc. and producing a zeolite particle having a silica/alumina weight ratio of 50/50, the zeolite particle has an ABD of about 1.08 gm./cc. On the other hand when the calcined silica particle has an ABD of 0.24 gm./cc. and the same weight ratio zeolite is produced, the zeolite particle has an ABD of 0.66 gm./cc.

The calcined particles are contacted with the treating solution at temperatures of from 25° C. to 150° C. and preferably 50° C. to 120° C. Generally, the higher the temperature the shorter is the required contacting time. The contacting times vary from a few minutes to several days although preferable times vary from 2 or 4 hours up to about 24 hours. For example, pure silica spheres whose diameter is substantially $\frac{1}{16}$ of an inch are completely converted to a molecular sieve by contact with an aqueous solution of $NaAlO_2$ in less than 18 hours at 100° C. It is desirable that the treating solution have a high pH, greater than 11 and preferably greater than about 12 in order to effectively rearrange the calcined refractory oxide molecular structure into a zeolite crystal structure.

One factor in the determination of the zeolite type is the silica to alumina ratio. Thus in the formation of a given type zeolite the starting calcined particle and the treating solution must give to the finished zeolite a molecular ratio of silica to alumina to result in said given type. This means that the concentration and amount of silicate or aluminate ions in the treating solution is adjusted, in relation to the concentration of alumina and/or silica in the calcined particle to provide the proper silica to alumina ratio in the finished zeolite. For example when producing Type A zeolite the silica/alumina weight ratio is selected within the range of from 46/54 to about 55/45. Therefore especially when starting with a silica or an alumina particle an appreciable amount of alumina or silica respectively must be incorporated into the particle to produce Type A zeolite. Therefore the lowering of the ABD of the calcined silica or alumina particle by the method described hereinbefore is especially important in producing therefrom a Type A zeolite particle. When a silica-alumina calcined particle having a weight ratio of about 50/50 is employed, the ABD will not increase nearly as much when the particle is converted to a zeolite and it is not necesary to lower the ABD of the calcined particle. Other types of zeolites having different ratios of silica to alumina such as Type X, etc., may be advantageously produced by the method of this invention. In the case of producing Type X the silica/alumina weight ratio should be about 65/35.

After the zeolite particles have been separated from the treating solution, the alkali metal cations may be exchanged with other cations such as alkaline earth metal cations and especially calcium ions. This technique is effective in changing the size of the pore entrance. Commonly the alkali metal cation is sodium which yields a Type A zeolite having pore entrances of about 4 Angstrom units. By ion exchanging a major portion of the sodium cations with calcium cations, the effective pore entrance size of the zeolite is increased to about 5 Angstrom units. These 5 Angstrom Type A zeolites are useful in separation of straight chain hydrocarbons from their branched chain isomers and cyclic analogs.

In a batch preparation method, after the particles have been converted to zeolites by contact with the treating solution they may be separated from the spent treating solution by decanting off the spent solution or by using any other well-known method of separating a solid phase from a liquid phase. It is possible to convert the solid calcined particles to zeolites in a continuous process wherein the solid refractory oxide particles and fresh treating solution are continuously introduced into a contactor while spent treating solution and zeolites are continuously withdrawn from the contactor. It is also possible to employ a semi-continuous process such as that in which the treating solution is circulated from one tank to another, each tank containing solid particles at various stages of conversion to zeolite. It is also possible to use elevated pressures during the contacting step in order to accelerate the conversion of the refractory oxide particles to zeolite particles.

The zeolites produced by the method of this invention may also be employed as supports for catalysts. The zeolites produced by the method of this invention are a preferable carrier for a metal catalyst impregnated thereon because of their size, shape and uniformity. Spherically shaped catalyst particles are preferable since reactants that pass over a fixed bed of catalyst will pass over a more uniformly packed bed, thereby reducing channeling and allowing more efficient contact between said reactants and the catalyst. Furthermore, the uniformity, the surface area and the density of the catalyst particles are more easily controlled.

The following examples are presented to further illustrate the method of this invention, but it is not intended to limit the invention to the materials shown therein.

*Example 1*

A batch of silica hydrogel spheres is prepared as follows. A 16% $SiO_2$ solution, a 20% HCl solution and a 28% hexamethylenetetramine (HMT) are prepared. All the ingredients are chilled to about 45° F. and a mixing vessel is installed in an ice bath. 345 cc. of the HCl solution are added to the mixing vessel. Thereafter, 1045 cc. of the $SiO_2$ solution is added slowly and steadily to the acid in the mixing vessel with constant stirring. 60 cc. of the HMT solution is diluted with 60 cc. of water and the resulting diluted solution is added to the mixing vessel. The resulting solution is dropped into a forming oil maintained at 95° C. in discrete spherical hydrogel particles. The resulting hydrogel particles are separated from the forming oil and contacted with 5 gallons of water at 95° C. for 8 hours. The hydrogel spheres are thereupon dried at 125° C. and calcined at 650° C. yielding $\frac{1}{32}$ of an inch spheres having an ABD of 0.47 gm./cc.

150 grams of the 0.47 ABD calcined spheres are contacted with 282 grams of sodium aluminate and 525 cc. of water for 24 hours at about 95° C. The calcined particles are converted to $\frac{1}{32}$ of an inch spherical Type A zeolites having a weight ratio of $SiO_2/Al_2O_3$ of 52.5/47.5. These zeolites are ion exchanged with calcium ions by contacting the spheres with a calcium chloride solution for 16 hours at 95° C. The resulting calcium Type A sieves are thereupon dried at 115° C. for 6 hours and have a finished ABD of 1.07 gm./cc.

A gas evolution test is performed by loading 20 grams of the $\frac{1}{32}$ of an inch spherical 1.07 ABD calcium Type A zeolites into a vessel and purging with nitrogen until the pores of the zeolite contain substantially all nitrogen. 50 cc. of 2,2,4-trimethylpentane is added to the vessel completely covering the zeolites and displacing the nitrogen from the void spaces between the zeolite particles. After complete displacement of the nitrogen from the void spaces between the spherical particles, 5 cc. of technical grade normal hexane was added to the vessel. The trimethylpentane molecules are too large to pass through the pore entrance of the zeolite particles but when the straight chain hexane is added to the vessel, the latter compound can pass through the pore entrance of the zeolite particles and displace nitrogen from the pore cavities. The displaced nitrogen is collected and measured. The rate of displacement of nitrogen especially in the first few minutes is a measure of the rate of exchange of the molecular sieve while the totally evolved nitrogen is a measure of the ultimate hydrocarbon capacity. Both of these properties are important in determining whether a molecular sieve is a satisfactory sorbent in an adsorption process. Two and one-half minutes after adding the normal hexane to the vessel, 100 cc. of nitrogen per 100 grams of zeolite at standard conditions are evolved. After allowing the mixture in the vessel to stand for 2 hours thus approaching equilibrium 1052 cc. of nitrogen per 100 grams of zeolite are evolved.

*Example 2*

Another batch of spherical silica hydrogel particles are prepared as described in Example 1. After the spheres have been water washed, the water is removed and the hydrogel spheres are soaked in isopropanol for 11 hours. The isopropanol is drained off and fresh isopropanol is added and the spheres are contacted for 1 hour. This procedure is repeated twice more. The spheres are dried at room temperature (about 21° C.) in the presence of moving dry air until they roll freely on a flat surface. The temperature of the air in contact with the spheres is raised to 100° C. and held there for 1 hour. Thereafter the temperature is increased to 600° C. and held there for 3 hours, yielding $\frac{1}{32}$ of an inch spheres having an ABD of 0.24 gm./cc.

One hundred and fifty grams of the 0.24 ABD calcined spheres are contacted with 344 grams of sodium aluminate and 700 cc. of water for 1 hour at 95° C. The calcined spheres are thereby converted to $\frac{1}{32}$ of an inch spherical Type A zeolites having a weight ratio of $SiO_2/Al_2O_3$ of 50/50. These zeolites are ion exchanged with calcium ions by contacting the spheres with a calcium chloride solution at room temperature and thereafter the calcium Type A zeolites are dried at 115° C. for 6 hours yielding a finished zeolite ABD of 0.66 gm./cc.

A gas evolution test as described in Example 1 is performed on the 0.66 ABD zeolites. Two and one-half minutes after adding the normal hexane to the vessel 1065 cc. of nitrogen per 100 grams of zeolite at standard conditions are evolved. After allowing the mixture in the vessel to approach equilibrium (which took only about 10 minutes) 1797 cc. of nitrogen per 100 grams of zeolite are evolved. Comparison of the results of Example 1 with Example 2 show very clearly that by lowering the ABD of the finished zeolite from 1.07 to 0.66 gm./cc. the rate of exchange as measured by the gas evolution test is increased by about a factor of 10. The zeolites produced in Example 2 are quite a bit softer than those produced in Example 1 and unsuitable for most commercial applications.

*Example 3*

Another batch of spherical hydrogel particles are prepared as described in Example 1. In this case the spheres are also washed in isopropanol but for less time and with only one contacting period. The spheres are again dried at room temperature in the presence of moving dry air until they roll freely on a flat surface, dried further at 100° C. and calcined at 600° C. yielding $\frac{1}{32}$ of an inch spheres having an ABD of 0.29 gm./cc.

One hundred and fifty grams of the 0.29 ABD calcined spheres are contacted with 344 grams of sodium aluminate and 700 cc. of water for 10 hours at 95° C. The calcined spheres are thereby converted to $\frac{1}{32}$ of an inch spherical Type A zeolites having a weight ratio of $SiO_2/Al_2O_3$ of 50/50. These zeolites are ion exchanged with calcium ions by contacting the spheres with a calcium chloride solution at room temperature and the zeolites are dried yielding a finished zeolite ABD of 0.80 gm./cc.

A gas evolution test as described in Example 1 is performed on the 0.80 ABD zeolites. Two and one-half minutes after adding the normal hexane to the vessel 569 cc. of nitrogen per 100 grams of zeolite at standard conditions are evolved. After allowing the mixture in the vessel to approach equilibrium (which took about 20 minutes) 1813 cc. of nitrogen per 100 grams of zeolite are evolved. Comparison of these results with those of Examples 1 and 2 show the 0.8 ABD zeolite to have about 5.5 times as high a rate of exchange as that of a 1.07 ABD zeolite. Although the 0.8 ABD zeolites have a lower exchange rate than the 0.66 ABD zeolites they are strong and sturdy and are suitable for use in commercial processes while possessing sufficiently high exchange rates to allow economical separation of straight chain components from branched chain isomers and cyclic analogs.

I claim as my invention:

1. A method of preparing synthetic zeolite particles having a predetermined size and shape and an apparent bulk density of from about 0.70 to about 0.95 gm./cc. which comprises:

preparing a sol of an inorganic oxide selected from the group consisting of silica and alumina;
mixing a gelling agent with said sol;

forming hydrogel particles from the resulting mixture;
contacting the undried hydrogel particles with an organic liquid that is miscible with water and has a lower surface tension than water, sufficient water in said hydrogel particles being displaced by said liquid to decrease shrinkage of the particles when dried and calcined;
drying and calcining the hydrogel particles to form solid inorganic oxide particles of said size and shape;
bringing said solid inorganic oxide particles into contact with an aqueous treating solution containing alkali metal cations and anions selected from the group consisting of hydroxyl, silicate and aluminate, the composition of said treating solution being established in relation to the original composition of said solid inorganic oxide particles to form the desired zeolite;
maintaining the particles in contact with said treating solution until they are substantially converted to zeolite particles of said size and shape; and
separating the particles from the treating solution and drying the particles to yield zeolite particles having an apparent bulk density of from about 0.70 to about 0.95 gm./cc.

2. The method of claim 1 further characterized in that the liquid is an organic material having from 1 to about 5 carbon atoms per molecule.

3. The method of claim 2 further characterized in that the organic liquid is selected from the group consisting of alcohols and ketones.

4. The method of claim 3 further characterized in that the organic liquid is selected from the group consisting of methanol, ethanol, propanol and acetone.

5. A method of producing binderless high rate synthetic zeolite particles having a spherical shape and an apparent bulk density of from about 0.70 to about 0.95 gm./cc. which comprises:
mixing together an aqueous silica sol, an aqueous acid selected from the group consisting of hydrochloric and sulfuric acid and an aqueous hexamethylenetetramine solution;
forming spherically shaped hydrogel particles from the mixture;
contacting the undried hydrogel particles with an organic liquid selected from the group consisting of methanol, ethanol, propanol and acetone, sufficient water in said hydrogel particles being displaced by said liquid to decrease shrinkage of the particles when dried and calcined;
drying and calcining the resulting hydrogel particles to form low density solid spherically shaped silica particles;
bringing the silica particles into contact with an aqueous treating solution containing alkali metal cations and aluminate anions, the composition and amount of the treating solution being established in relation to weight of silica particles to form the desired zeolite having a silica/alumina weight ratio of from about 46/54 to about 55/45;
maintaining said particles in contact with the treating solution until the particles are substantially converted to spherically shaped zeolite particles; and
separating the particles from the treating solution and drying the particles to yield zeolite particles having an apparent bulk density of from about 0.70 to about 0.95 gm./cc.

6. A method of producing binderless high rate synthetic zeolite particles having a spherical shape and an apparent bulk density of from about 0.70 to about 0.95 gm./cc. which comprises:
mixing together an alumina sol having an aluminum to chloride weight ratio of from about 1.0 to about 1.4, hexamethylenetetramine and urea in an aqueous mixture;
forming spherically shaped hydrogel particles from the mixture;
contacting the undried hydrogel particles with an organic liquid selected from the group consisting of methanol, ethanol, propanol and acetone, sufficient water in said hydrogel particles being displaced by said liquid to decrease shrinkage of the particles when dried and calcined;
drying and calcining the resulting hydrogel particles to form low density solid spherically shaped alumina particles;
bringing the alumina particles into contact with an aqueous treating solution containing alkali metal cations and silicate anions, the composition and amount of the treating solution being established in relation to the weight of alumina particles to form the desired zeolite having a silica/alumina weight ratio of from about 46/54 to about 55/45;
maintaining said particles in contact with the treating solution until the particles are substantially converted to spherically shaped zeolite particles; and
separating the particles from the treating solution and drying the particles to yield zeolite particles having an apparent bulk density of from about 0.70 to about 0.95 gm./cc.

7. A method of producing binderless high rate synthetic zeolite particles having a spherical shape and an apparent bulk density of from about 0.70 to about 0.95 gm./cc. which comprises:
mixing together an aqueous silica sol containing hydrochloric acid and an alumina sol having an aluminum to chloride ratio of from about 1.0 to about 1.4;
adding gelling agents and forming spherically shaped particles from the mixture;
contacting the undried hydrogel particles wtih an organic liquid selected from the group consisting of methanol, ethanol, propanol and acetone, sufficient water in said hydrogel particles being displaced by said liquid to decrease shrinkage of the particles when dried and calcined;
drying and calcining the resulting hydrogel particles to form low density solid spherically shaped silica-alumina particles;
bringing the silica-alumina particles into contact with an aqueous treating solution containing alkali metal cations and hydroxyl anions and having a pH greater than 11, the composition and amount of the treating solution being established in relation to the composition and weight of said silica-alumina particles to form the desired zeolite;
maintaining said particles in contact with the treating solution until the particles are substantially converted to spherically shaped zeolite particles; and
separating the particles from the treating solution and drying the particles to yield zeolite particles having an apparent bulk density of from about 0.70 to about 0.95 gm./cc.

8. A method of producing binderless high rate synthetic zeolite particles having a predetermined size and shape and an apparent bulk density of from about 0.70 to about 0.95 gm./cc. which comprises:
mixing together an aqueous silica sol, an aqueous acid selected from the group consisting of hydrochloric and sulfuric acid and an aqueous hexamethylenetetramine solution at a temperature of from about 0° C. to about 20° C.;
forming hydrogel particles of said shape from the mixed solution;
washing the hydrogel particles with a water wash solution;
contacting the washed undried hydrogel particles with an organic liquid selected from the group consisting of methanol, ethanol, propanol and acetone, sufficient water in said hydrogel particles being displaced by said liquid to decrease shrinkage of the particles when dried and calcined;

drying the resulting hydrogel particles first at room temperature until they roll freely and then in air at 100° C.;

calcining the resulting particles at 600° C. in air to form silica particles of said size and shape;

bringing the silica particles into contact with an aqueous treating solution comprising sodium aluminate and having a pH in excess of 11, the composition and amount of the treating solution being established in relation to the weight of silica particles to incorporate sufficient alumina in the finished zeolite to attain a silica/alumina weight ratio of from about 46/54 to about 55/45;

maintaining the particles in contact with the treating solution until the particles are substantially converted to zeolite particles; and separating the particles from the treating solution and drying the particles to yield zeolite particles having an apparent bulk density of from about 0.70 to about 0.95 gm./cc.

9. A method of preparing high rate synthetic zeolite particles having a predetermined size and shape and an apparent bulk density of from about 0.70 to about 0.95 gm./cc. which comprises:

mixing a silica sol, an acid and a gelling agent in an aqueous mixture having a pH less than 4;

forming hydrogel particles from said mixture;

contacting the undried hydrogel particles with an organic liquid that is miscible with water and has a lower surface tension than water, sufficient water in said hydrogel particles being displaced by said liquid to decrease shrinkage of the particles when dried and calcined;

drying and calcining the hydrogel particles to form solid silica particles of said size and shape;

bringing the silica particles into contact with an aqueous treating solution containing alkali metal cations and anions selected from the group consisting of hydroxyl and aluminate, the composition and amount of the treating solution being established in relation to the weight of silica particles to form the desired zeolite;

maintaining the particles in contact with the treating solution until they are substantially converted to zeolite particles of said size and shape; and separating the particles from the treating solution and drying the particles to yield zeolite particles having an apparent bulk density of from about 0.70 to about 0.95 gm./cc.

10. A method of preparing synthetic zeolite particles having a predetermined size and shape and an apparent bulk density of from about 0.70 to about 0.95 gm./cc. which comprises:

preparing calcined silica particles of said size and shape and having an apparent bulk density of from about 0.25 to about 0.35 gm./cc.;

bringing said silica particles into contact with an aqueous treating solution containing sodium metal cations and aluminate anions, the composition and amount of the treating solution being established in relation to the amount of silica particles to form the desired zeolite;

maintaining the particles in contact with said treating solution until they are substantially converted to zeolite particles of said size and shape; and separating the particles from the treating solution and drying the particles to yield zeolite particles having an apparent bulk density of from about 0.70 to about 0.95 gm./cc.

References Cited

UNITED STATES PATENTS

| | | | |
|---|---|---|---|
| 2,330,640 | 9/1943 | Teter | 252—453 |
| 2,384,942 | 9/1945 | Marisic | 242—448 X |
| 2,733,220 | 1/1956 | Wankat | 252—448 |
| 2,882,244 | 4/1959 | Milton | 23—112 X |
| 2,897,159 | 7/1959 | Hoekstra et al. | 252—448 |
| 3,096,295 | 7/1963 | Michalko | 252—448 |

FOREIGN PATENTS 630,193   8/1961   Canada.

OSCAR R. VERTIZ, *Primary Examiner.*

MAURICE A. BRINDISI, EDWARD J. MEROS,
*Examiners.*

H. S. MILLER, *Assistant Examiner.*